A. F. JONES.
AUTOMATIC COUNTER FORMING MACHINE.
APPLICATION FILED SEPT. 2, 1920.

1,421,947.

Patented July 4, 1922.
12 SHEETS—SHEET 1.

Fig. 1ᵃ.

Inventor:
A. F. Jones

A. F. JONES.
AUTOMATIC COUNTER FORMING MACHINE.
APPLICATION FILED SEPT. 2, 1920.
1,421,947.  Patented July 4, 1922.
12 SHEETS—SHEET 2.
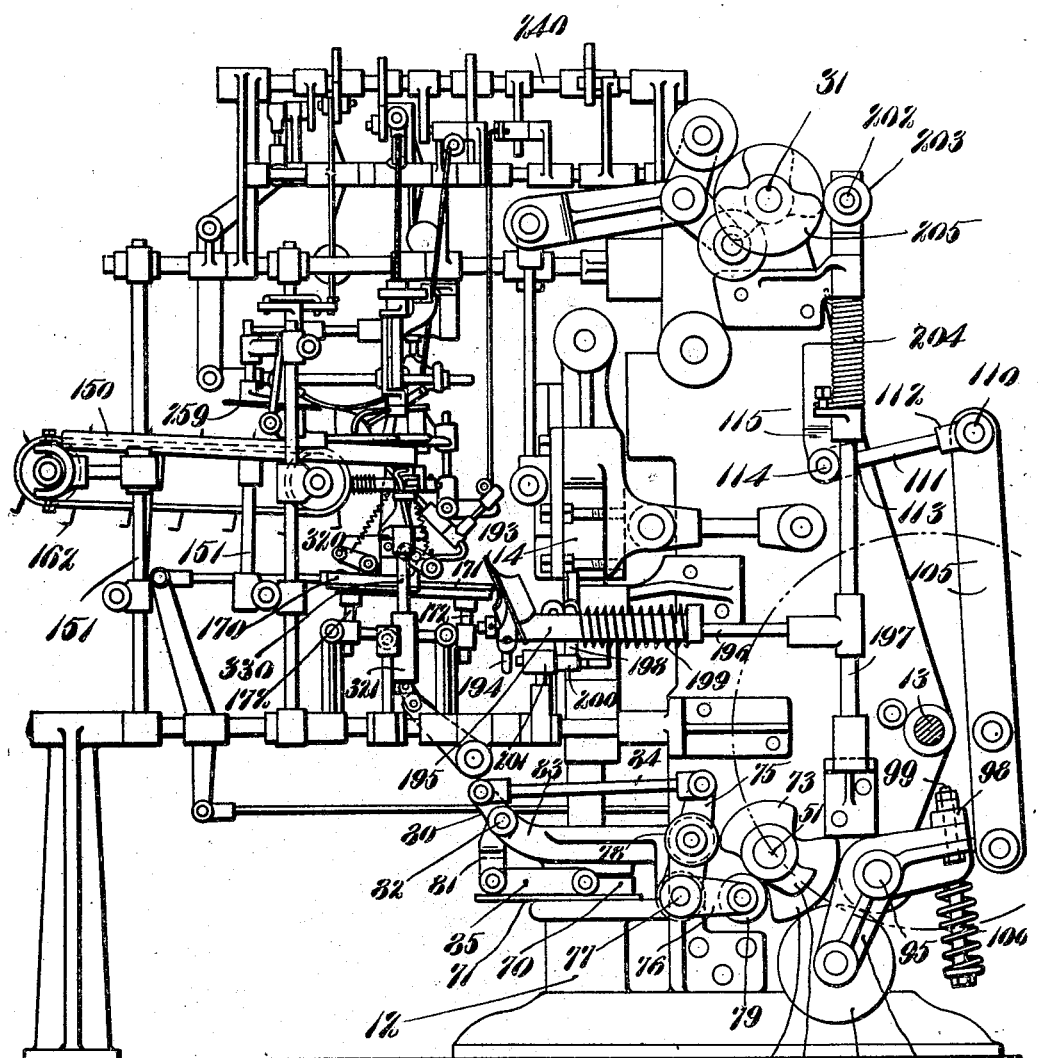
Fig. 2.
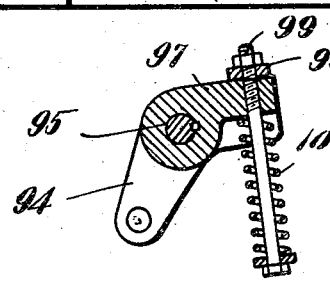
Fig. 2ª
Inventor:
A. F. Jones
by Wright Brown Quinby May
attys

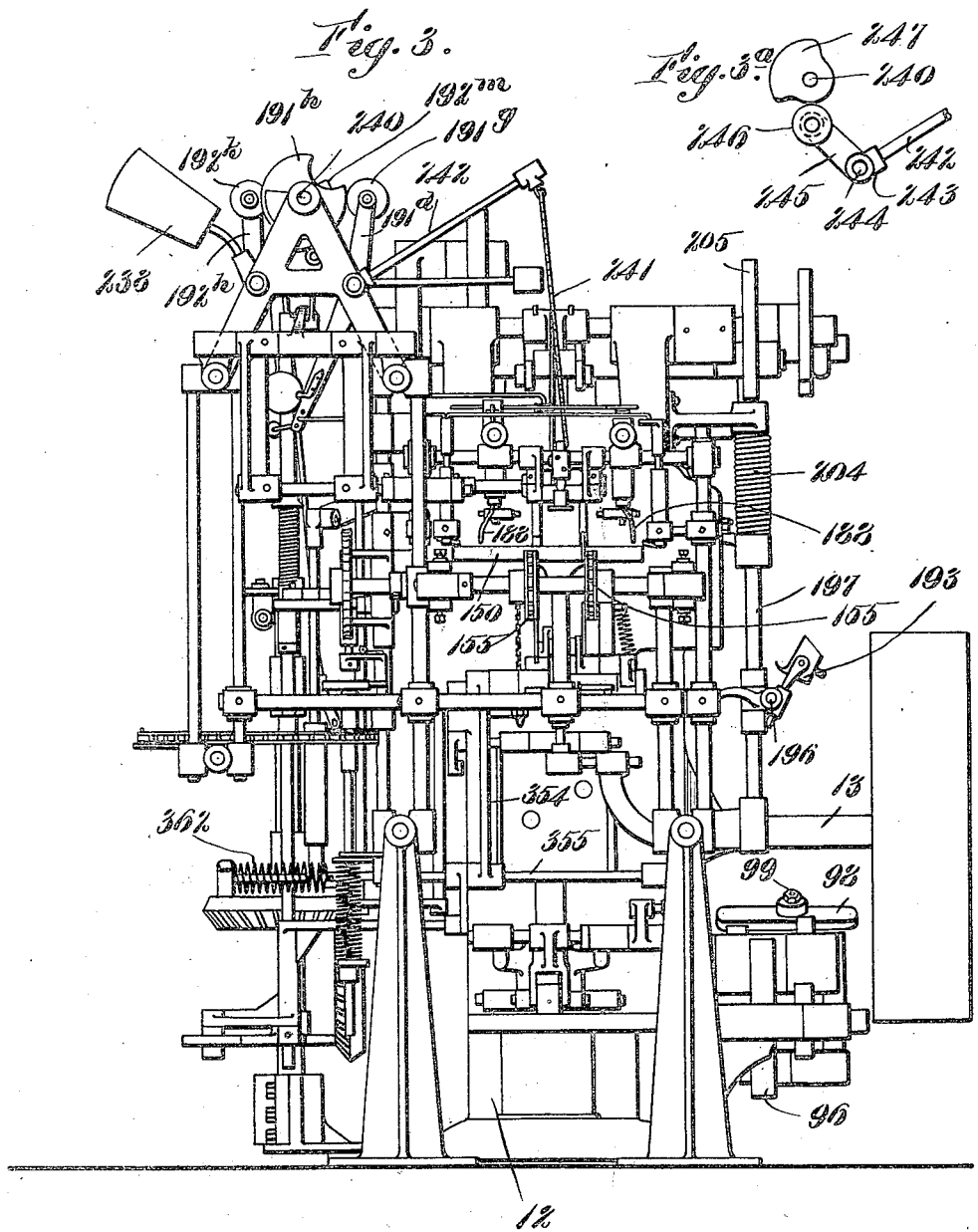

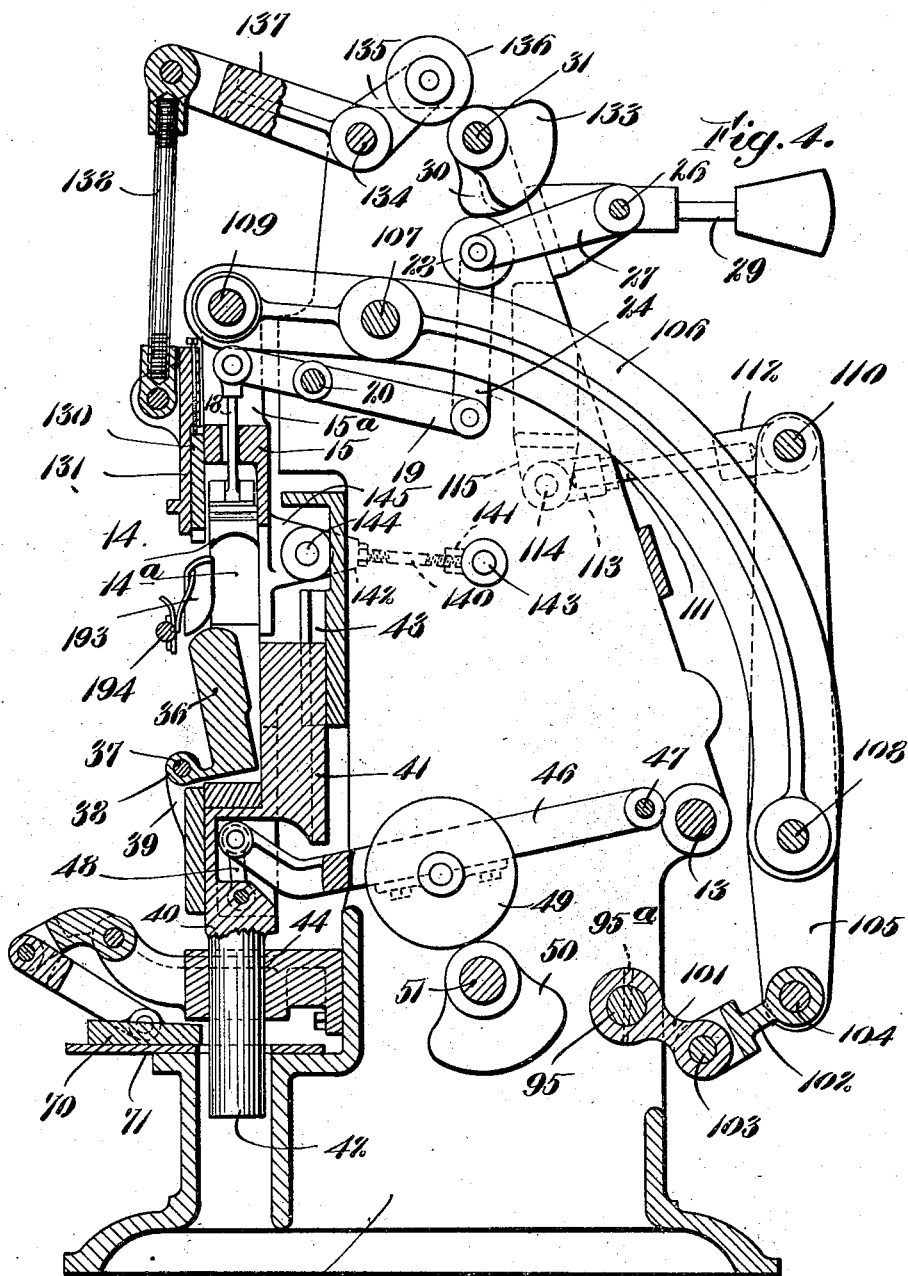

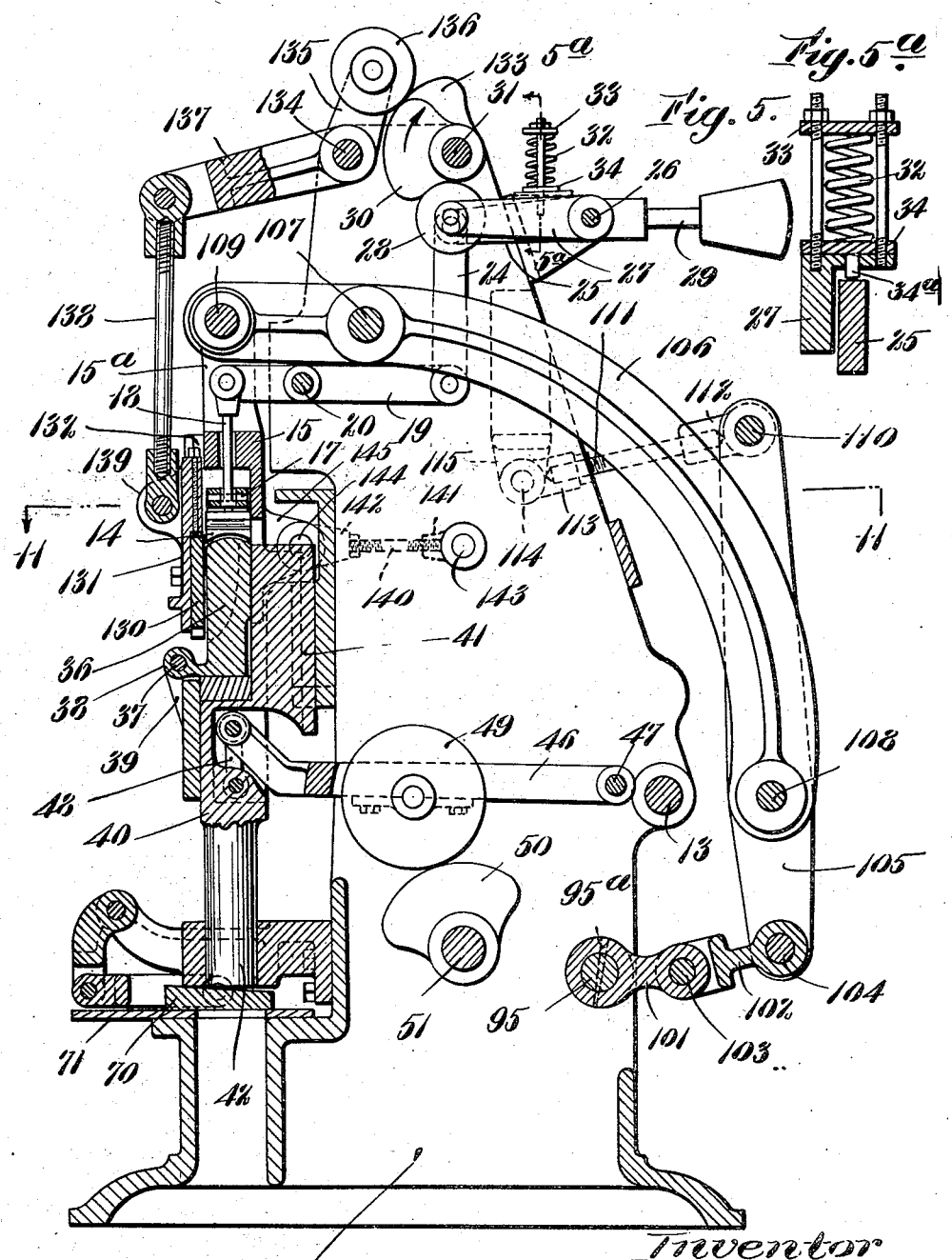

A. F. JONES.
AUTOMATIC COUNTER FORMING MACHINE.
APPLICATION FILED SEPT. 2, 1920.
1,421,947.
Patented July 4, 1922.
12 SHEETS—SHEET 6.
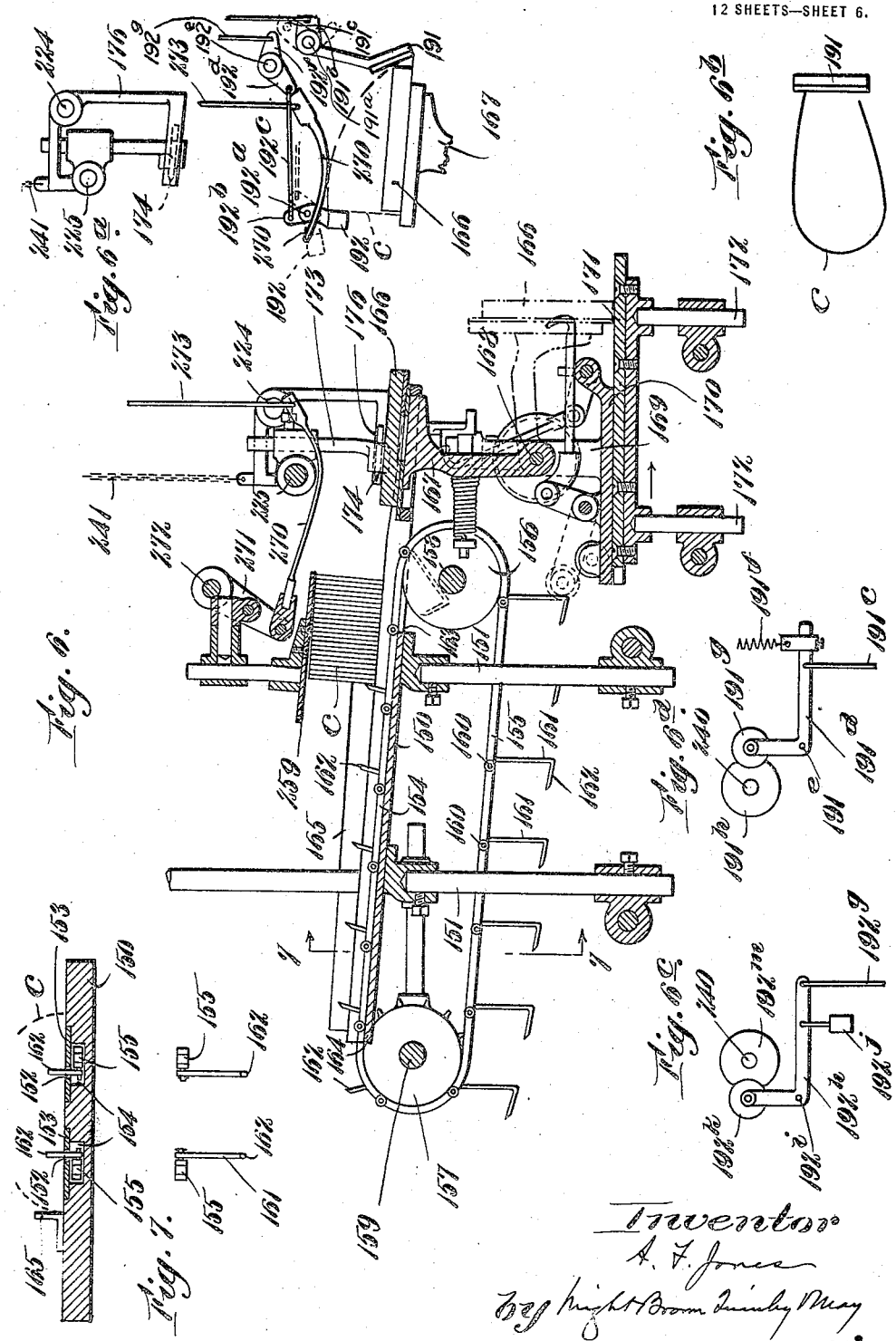

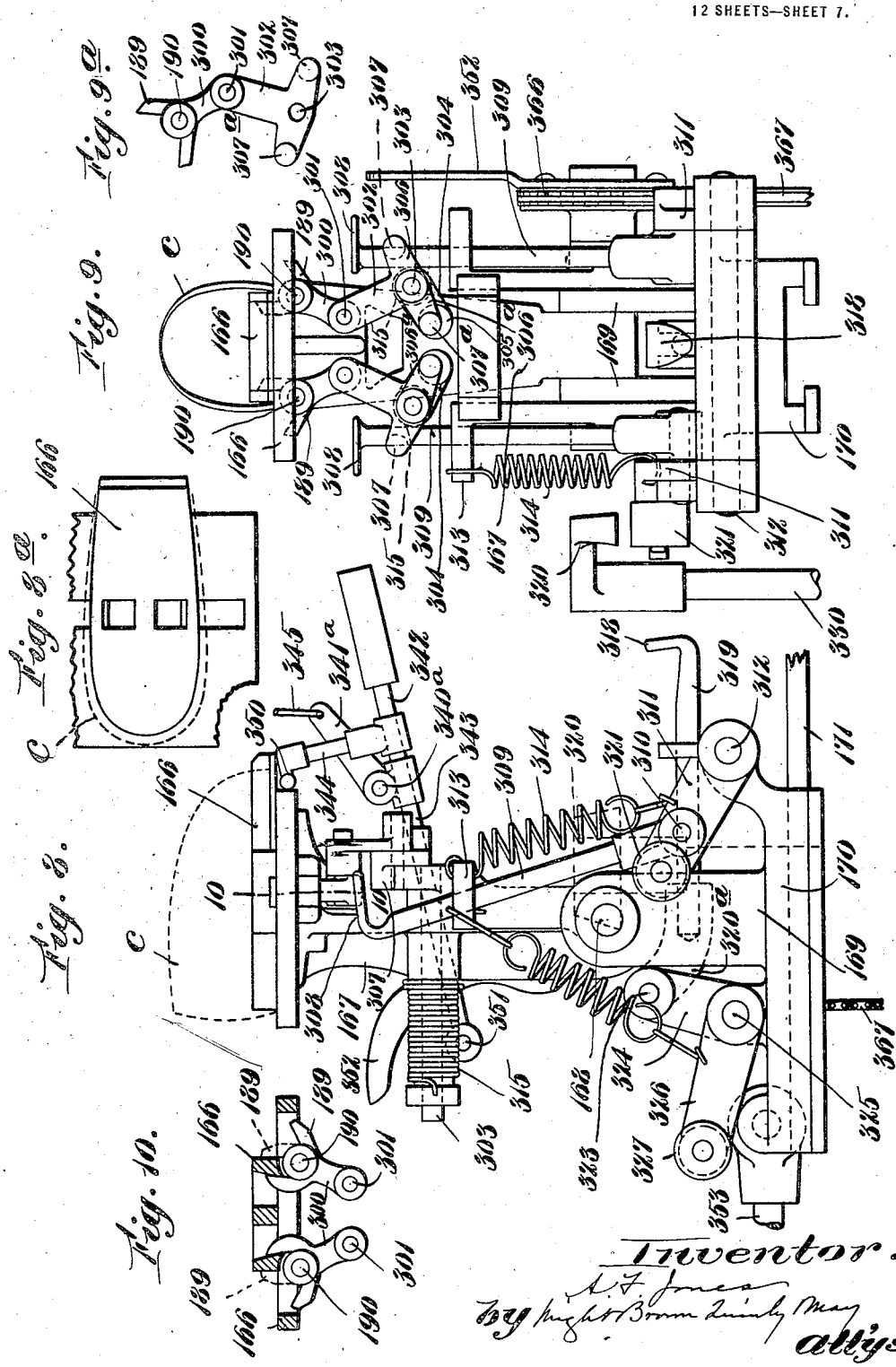
A. F. JONES.
AUTOMATIC COUNTER FORMING MACHINE.
APPLICATION FILED SEPT. 2, 1920.
1,421,947. Patented July 4, 1922.
12 SHEETS—SHEET 7.

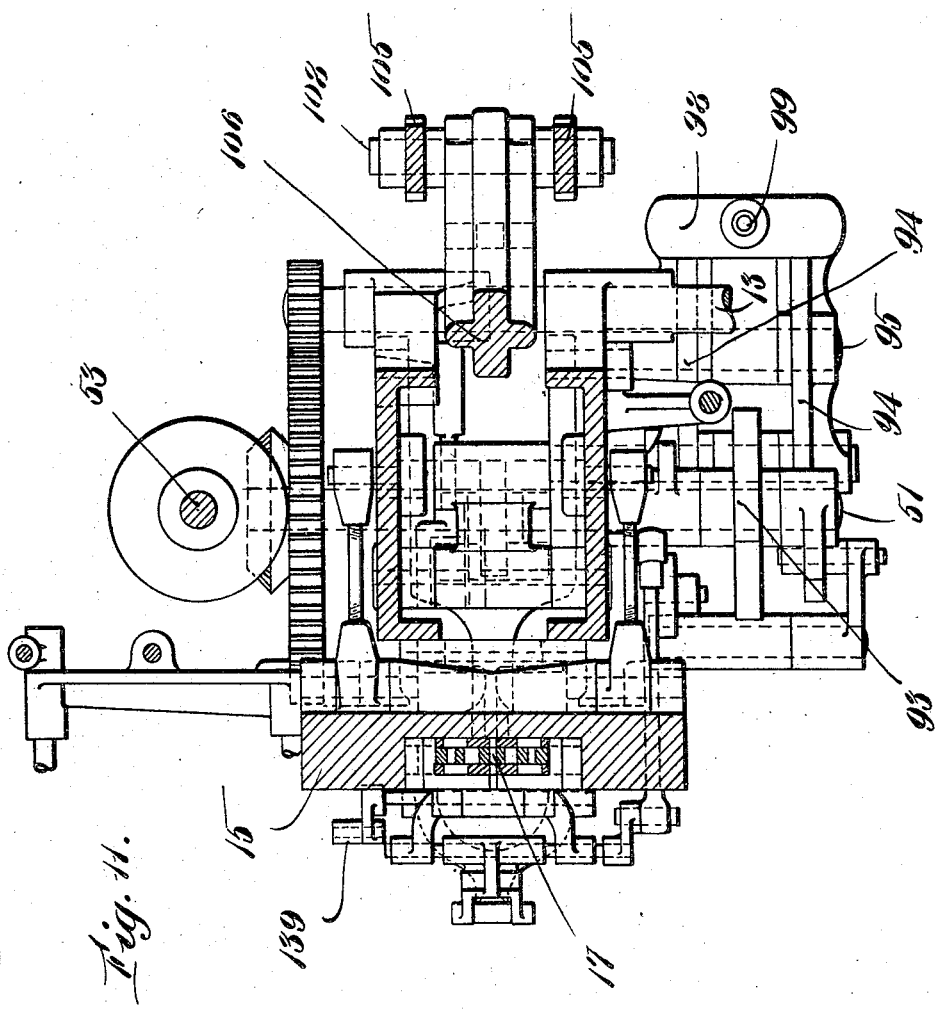

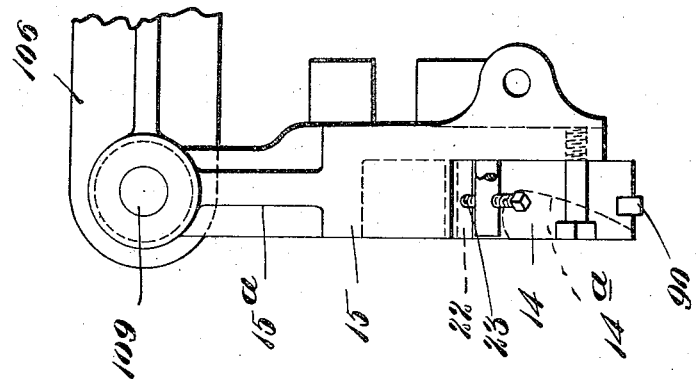
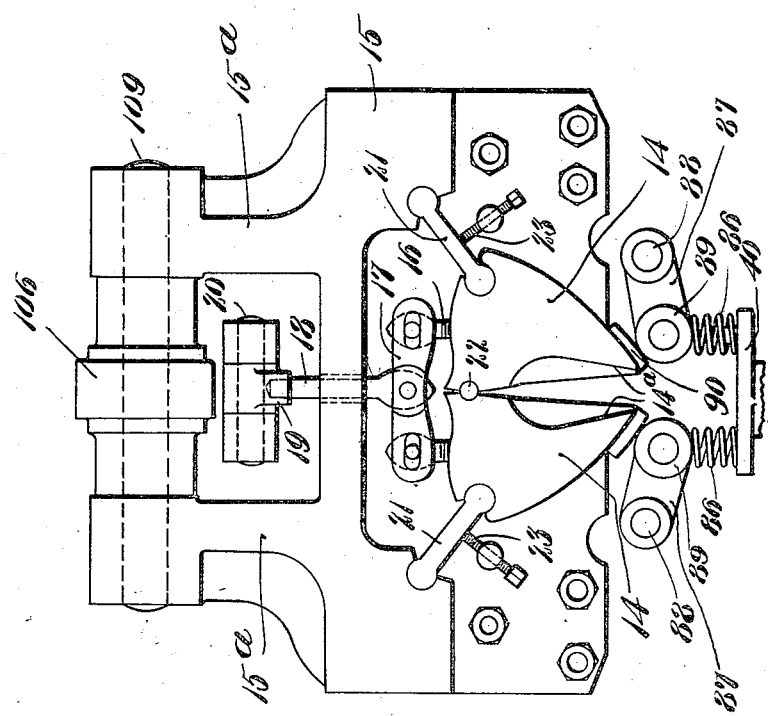

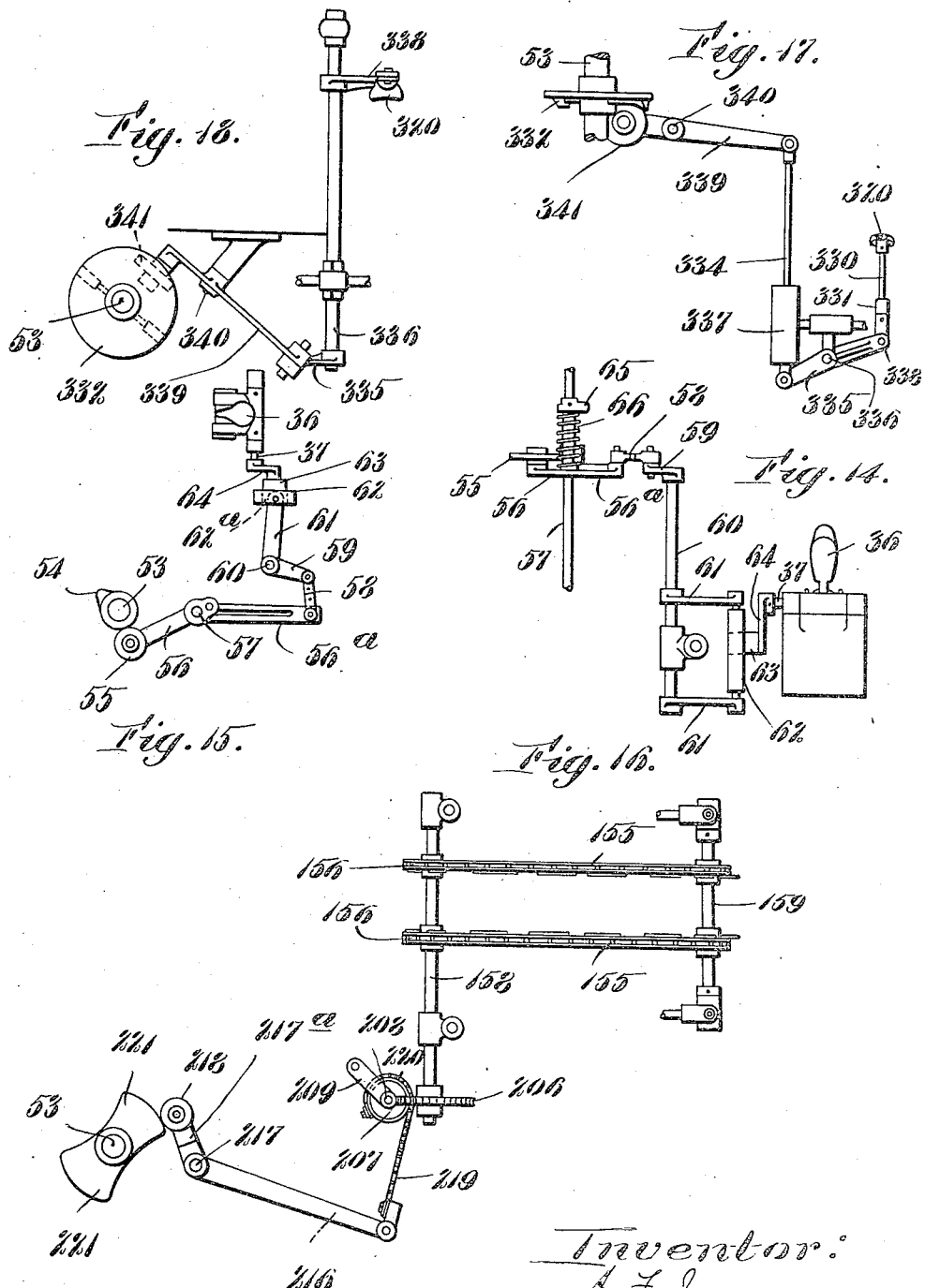

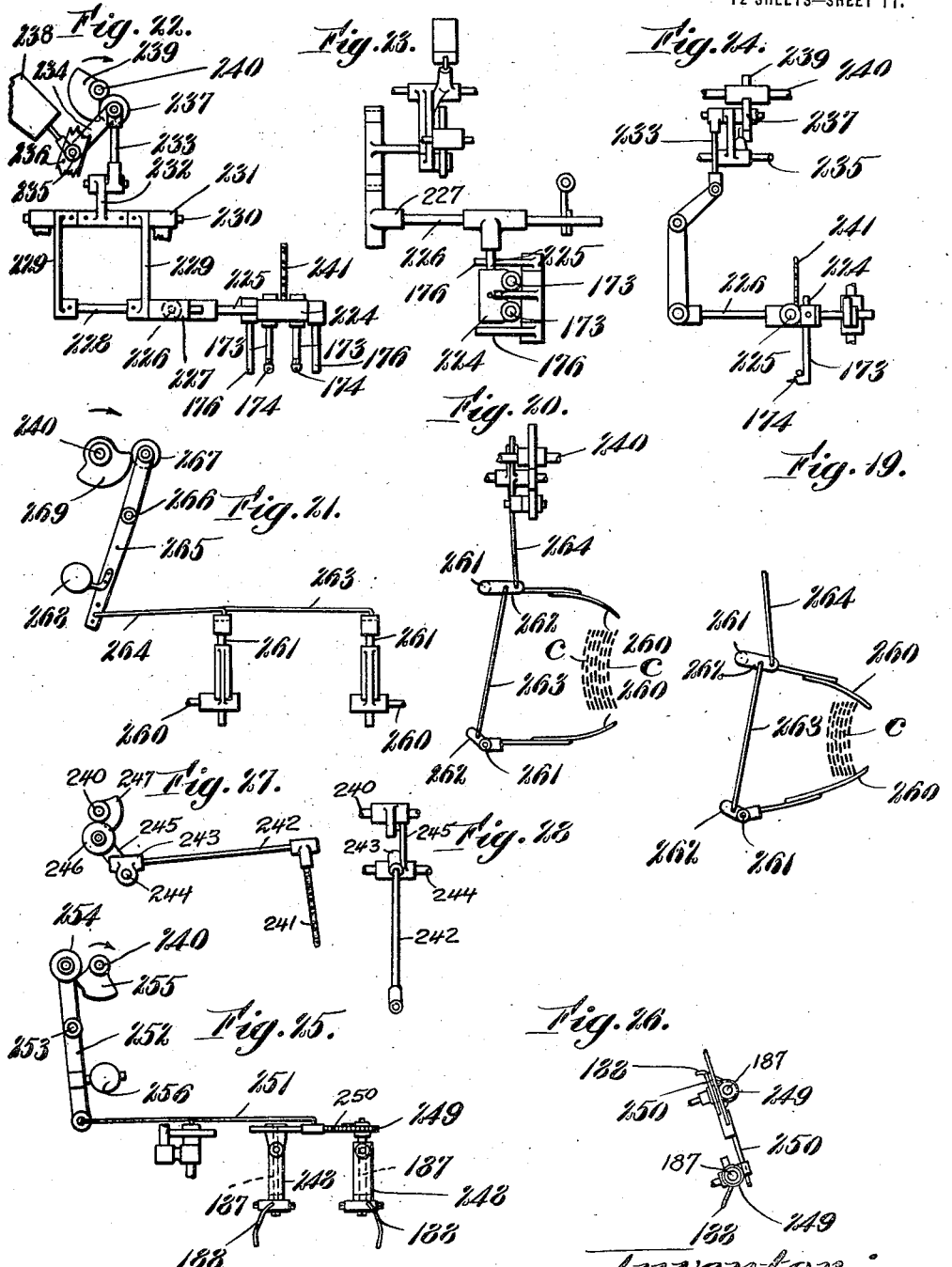

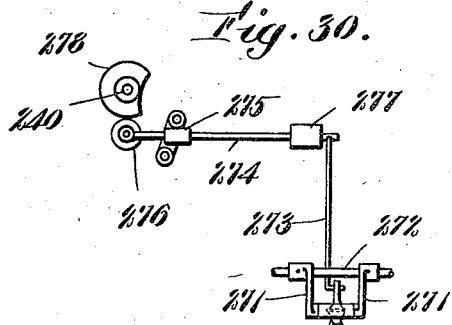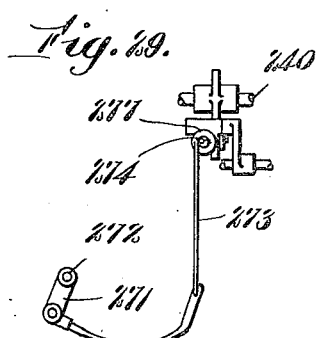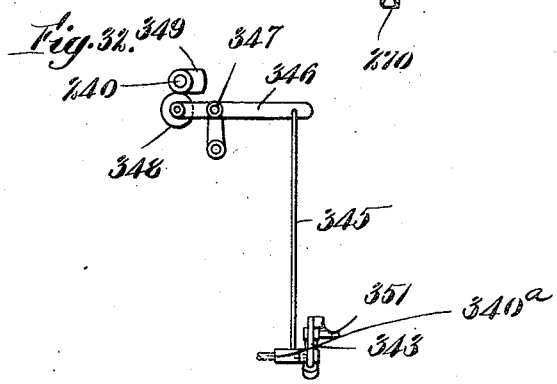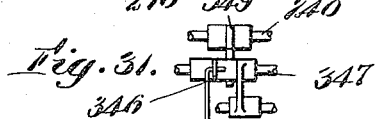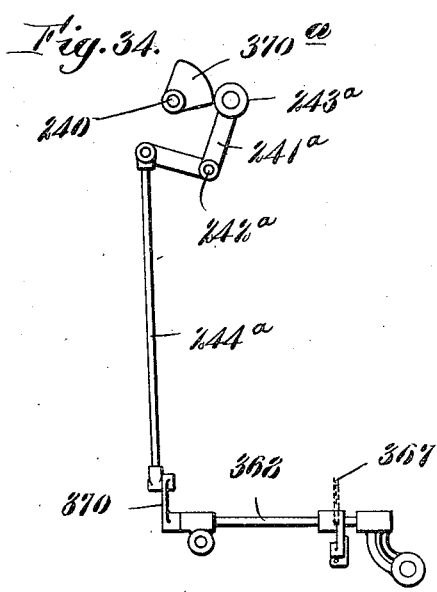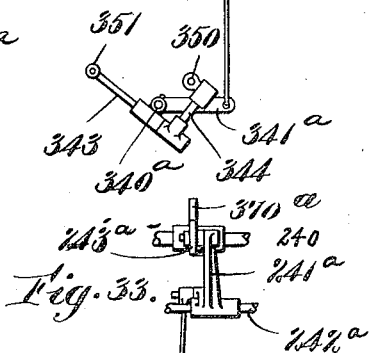

UNITED STATES PATENT OFFICE.

ALBERT F. JONES, OF SALEM, MASSACHUSETTS.

AUTOMATIC COUNTER-FORMING MACHINE.

1,421,947.  Specification of Letters Patent.  Patented July 4, 1922.

Application filed September 2, 1920. Serial No. 407,778.

*To all whom it may concern:*

Be it known that I, ALBERT F. JONES, a citizen of Canada, residing at Salem, in the county of Essex and State of Massachusetts, have invented new and useful Improvements in Automatic Counter-Forming Machines, of which the following is a specification.

This invention relates to a machine including a pair of female shaping dies and a male shaping die co-operating therewith, the machine being organized to automatically supply clam-shelled counter blanks one by one to the mold cavity formed by the female shaping dies, while the male shaping die is removed from said cavity, the blank being left in position to be converted into a counter by the action of said dies and a flange-forming wiper co-operating therewith.

One object of the invention is to provide a blank-supplying mechanism, including means whereby the blank is automatically bent to substantially or approximately its final longitudinal curvature before it is inserted between the female dies.

Another object is to provide improved mechanism for exerting shaping pressure on the dies by successive operations, including the application of a relatively light pressure followed by a relatively heavy pressure.

Another object is to provide improved means for automatically removing the completed counters from the machine.

Other objects of the invention will be apparent from the following specification, in connection with the accompanying drawings, in which:

Figure 1 is an elevation looking toward one side of the machine.

Figure 1ª is a fragmentary detail view.

Figure 2 is an elevation looking toward the side opposite that shown by Figure 1.

Figure 2ª is a fragmentary detail view, showing partly in section a member shown by Figure 2.

Figure 3 is an elevation looking toward one end of the machine.

Figure 3ª is a fragmentary detail view.

Figure 4 is a vertical section including the shaping dies and the mechanism for operating the same, the male die being removed from the female dies.

Figure 5 is a view similar to Figure 4, showing the male die within the female dies.

Figure 1:
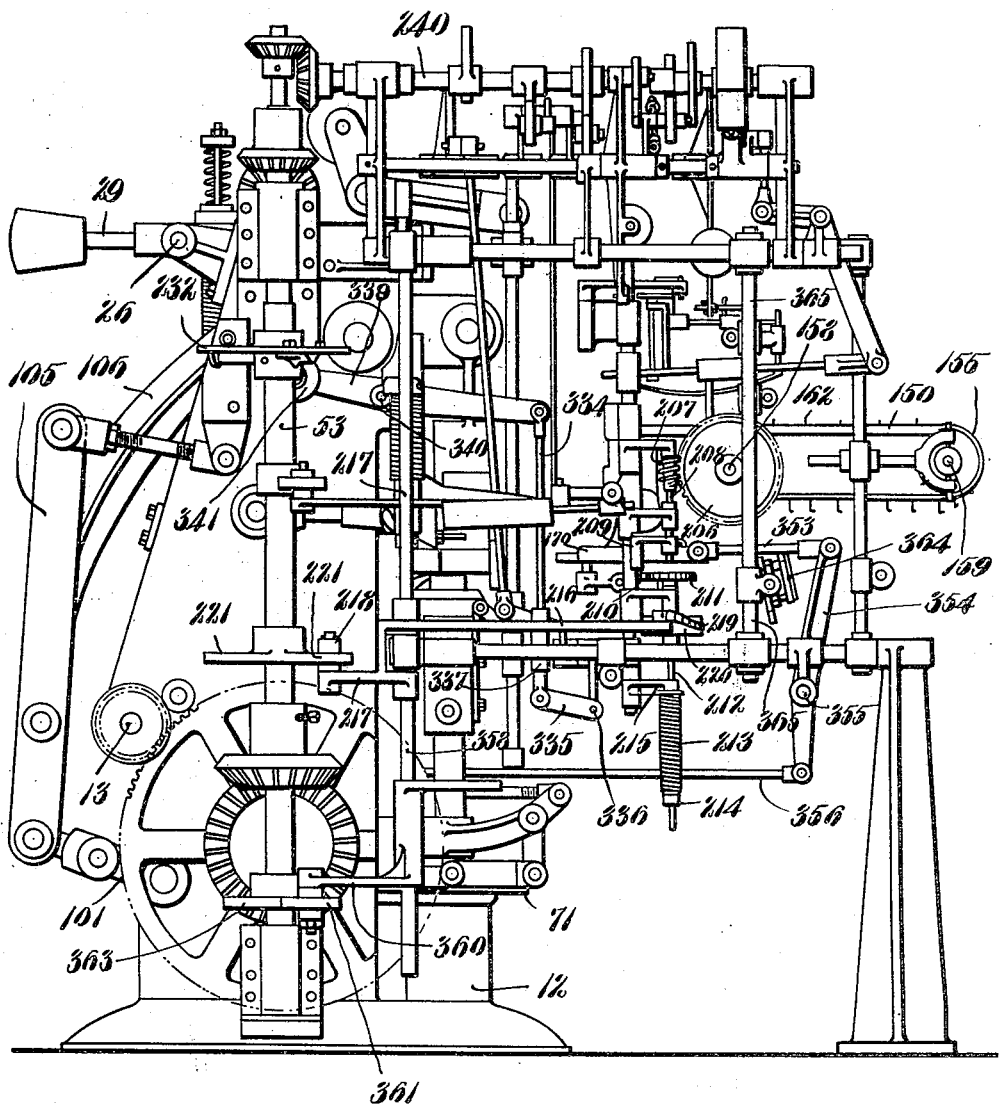

Figure 5ª is a fragmentary section on line 5ª—5ª of Figure 5.

Figure 6 is a sectional view, showing the mechanism whereby blanks are presented to the shaping dies.

Figure 6ª is a fragmentary side view, showing the form and the blank eveners.

Figure 6ᵇ is a diagrammatic view, showing the action of one of the eveners on a blank.

Figures 6ᶜ and 6ᵈ are fragmentary views, showing the evener-operating cams and levers.

Figure 7 is a section on line 7—7 of Figure 6.

Figure 8 is a side elevation, showing the blank-carrying form and the mechanism supporting the same.

Figure 8ª is a plan view of the blank-carrying form.

Figure 9 is a front elevation of the structure shown by Figure 8.

Figure 9ª is a fragmentary detail view supplemental to Figure 9.

Figure 10 is a section on line 10—10 of Figure 8.

Figure 11 is a section approximately on line 11—11 of Figure 5, and a plan view of parts below said line.

Figure 12 is a front elevation, showing the female shaping dies, and the cross head supporting the same.

Figure 13 is an elevation looking toward one end of Figure 12.

Figures 14 to 34 are fragmentary views, showing various details of the mechanism hereinafter described.

The same reference characters indicate the same parts in all of the figures.

12 represents the frame of the machine, as indicated, and 13 represents the driving shaft. The molding mechanism includes a pair of outside jaws, or female shaping dies, 14, 14 (Figure 12), having molding faces 14ª forming a female mold adapted to be opened and closed. The dies 14 are suspended by shanks 16 from a cross bar 17, which is supported by a rod 18, connected with a rocker arm 19, fulcrumed at 20. When the rocker arm is moved to raise the rod 18 from the position shown by Figure 12, the dies 14 are swung together to close the female mold, through the action of struts 21, interposed between sockets in a cross head 15,—which is vertically movable and adapted to oscillate slightly, as hereinafter described,—and sockets in the dies 14. A rounded projection 22, fixed to one die and entering a corresponding recess in the other die, prevents independent vertical movements of the dies. The opening of the dies is limited by adjustable stop screws 23.

The rocker arm 19 is connected by a rod 24 with an arm 25, which is fixed to a shaft 26 (Figure 5). Loosely mounted on the shaft 26, beside the arm 25, is an arm 27, carrying a trundle roll 28, which is pressed by a weighted arm 29 on the shaft 26 against a cam 30 on a continuously-rotated shaft 31. A spring 32 is interposed between an abutment 33, movable with the arm 27, and an abutment 34, movable with the arm 25, through a strut 34ª (Figure 5ª).

When the cam 30 is in the position shown by Figure 5, the trundle roll and loose arm 27 are raised. The cam revolves in the direction of the arrow, and, when it reaches the trundle roll, it forces the arm 27 downward. Said arm turns loosely on the shaft 26, and exerts pressure through the spring 32 and strut 34ª on the arm 25, forcing the latter yieldingly downward and swinging the female dies 14 yieldingly to their closed position through the described connecting mechanism. By thus yieldingly closing the dies, I compensate for variations in the thickness of the blank which is between the dies and the inside or male die hereinafter described, and thus avoid injurious pressure.

36 represents the inside or male die, formed to enter and fit the cavity of the female dies, and having offset ears 38, attached to a rock shaft 37, journaled in ears 39 on a vertically sliding ram or carriage, indicated as a whole by the reference numeral 40. Said ram includes end portions 41 and 42, movable respectively in fixed vertical guides 43 and 44. The ram is movable to entirely withdraw the male die from the female dies, as shown by Figure 4, and thereby leave the cavity formed by the female dies unobstructed for the entrance into said cavity of a blank presented by the blank-carrying form hereinafter described. The ram is also movable to locate the inside jaw in the said cavity, as shown by Figure 5.

The ram is reciprocated vertically by the means next described.

46 represents a lever, mounted at one end to swing on a fixed support 47, and connected at its opposite end by a link 48 with the ram. A trundle roll 49 is journaled on the lever 46 between its ends. 50 represents a cam, revolved by a continuously-rotating shaft 51, and engaging the trundle roll 49 to oscillate the lever 46 and reciprocate the ram. When the ram is lowered, the male die 36 is swung outward, as shown by Figure 4, and, when the ram is raised, the male die is swung inward, each of these movements being caused by mechanism shown somewhat diagrammatically by Figures 14 and 15, and including the rock shaft 37, a continuously rotated vertical shaft 53, and connections, as next described, between the latter and the rock shaft 37. The shaft 53 has a cam 54 (Figure 15), which acts on a trundle roll 55 on the arm 56 of a two-armed lever pivoted on a fixed upright 57. The arm 56ª of said lever is connected by a link 58 with an upper arm 59 on an upright rock shaft 60. Said rock shaft has two lower arms 61, pivotally supporting a bar 62, having a longitudinal slot 62ª, which receives a trundle roll 63 on a crank-arm 64 fixed to the rock shaft 37. To a collar 65, attached to the upright rod 57, is attached one end of a torsional spring 66, the other end of which is attached to or engaged with the lever 56, 56ª. The arrangement and timing of said mechanism is such that the cam 54 acts to positively force the male die 36 outward, to the position shown by Figure 4, and the spring 66 acts to force said die inward to the position shown by Figure 5. The slot 62ª permits the trundle roll 63 to move vertically, and thus compensates for the vertical movements of the ram and the die 36.

When the ram is raised, it is locked and rigidly supported by a sliding abutment or wedge block 70, which is movable on a fixed bed 71, and is automatically moved, first to the position shown by Figure 4, and then to that shown by Figure 5, by means including the continuously-rotating shaft 51 (Figure 2), cams 73 and 74 fixed to said shaft, two connected lever arms 75 and 76, fulcrumed at 77, and provided with trundle rolls 78 and 79, two connected lever arms 80 and 81, fulcrumed at 82, on a fixed ear 83, a rod 84, connecting the lever arm 75 with the lever arm 80, and a link 85, connecting the lever arm 81 with the abutment 70. The arrangement and timing of the abutment-operating mechanism are such that the abutment is moved outward, as shown by Figure 4, just before the ram 40 is lowered, and is moved inward, as shown by Figure 5, after the ram is raised, so that the ram and the male die are rigidly supported when the die is in its operative position.

I call the member 40 a ram, because it exerts considerable upward force on the male die, and also exerts inward pressure through the means next described, on the female dies, whereby the dies are firmly closed on the male die and on the interposed blank.

The ram carries two heavy and stiff springs 86 (Figure 12), arranged to abut against short arms 87, which are pivoted at 88 to the frame, and are provided at their swinging ends with trundle rolls 89. The female dies 14 have inclined faces 90, against which the rolls 89 are pressed by the springs 86 when the ram rises, the arrangement being such that the dies 14 are yieldingly pressed toward each other with considerable force. When the ram is lowered, the springs 86 drop away from the arms 87 and their pressure on the dies 14 ceases.

I have provided means for exerting a heavy downward pressure on the female dies during the forming operation, and while the male die is locked in its raised position, said means being embodied as follows: To the shaft 51 is fixed a cam 93 (Figure 2). 94 represents a two-armed lever, mounted loosely on an idle shaft or stud 95, and carrying in its lower arm a trundle roll 96, which is held in contact with the cam 93 by the weight of the upper arm. Keyed to the shaft 95 is a short arm 97 (Figure 2ª), which projects between the divisions of the upper arm of the lever 94, said upper arm being bifurcated. A cross bar 98 is bolted to the upper arm. A bolt 99 passes through the bar 98 and arm 97. A spring 100 is interposed between the arm 97 and the head of the bolt 99. When the lever 94 is moved by the cam 93 to the position shown by Figure 2, the shaft 95 is turned to actuate the heavy pressure mechanism, by force exerted thereon through the spring 100 and arm 97, the latter being keyed, as stated, to the shaft. It should be here stated that the object of the connection of the lever 94 to the shaft 95, through the arm 97 and spring 100, instead of directly, is to provide a yielding element in the heavy-pressure-exerting means to compensate for variations in the thickness of different counter blanks.

To the shaft 95 is fixed, as by a pin 95ª one member 101 of a toggle, the other member 102 of which is pivoted at 103 to the member 101. The member 102 is pivoted at 104 to the lower end of a lever 105. This lever is compounded with a curved lever 106, which is mounted to swing on a fixed fulcrum 107, and has a longer arm to which the lever 105 is fulcrumed at 108. The shorter arm of the lever 106, constituting the upper end of the lever, is connected by a pintle 109 to ears 15ª on the cross head 15 above referred to. The upper and longer arm of the lever 105 is pivoted at 110 to an oscillatory confining arm, formed by a central member 111, and end members 112 and 113, internally threaded to engage right and left threads on the central member, so that the length of the confining arm may be varied. The end member 112 engages the pivot 110, which constitutes a swinging fulcrum for the lever 105, and the end member 113 is pivoted at 114 to a fixed ear 115 on the frame. When the female dies are opened, the described heavy-pressure-applying mechanism is in the condition shown by Figure 4, the toggle 101, 102, being broken or inactive, and the cross head 15 at the upper end of its limited vertical movement, the cam 93 (Figure 2) being now raised out of contact with the trundle roll 96. When the cam 93 reaches the position shown by Figure 2, it actuates the heavy-pressure-applying mechanism, as indicated by Figure 5, by straightening or rendering active the toggle 101, 102, thus swinging the lower arms of the levers 105 and 106 outward, and imparting to the shorter arm of the lever 106 and to the cross head 15 a downward movement which is sufficient to exert a heavy pressure through the female dies 14 on the central portion of a counter blank interposed between the female and the male dies. The amplitude or extent of the downward movement thus imparted to the cross head 15, and the outside jaws, may be varied by rotating the member 111 of the oscillatory arm which confines the upper end of the lever 105. Provision is thus made for compensating for variations of thickness of different counter blanks. The yielding element, including the spring 100 (Figure 2), enables the cross head and the outside jaws to yield sufficiently during the application of the heavy pressure to prevent injury to the machine, in case a counter of abnormal thickness is under pressure.

130 represents the wiper, which forms the usual flange on the body of a counter molded by the dies. The wiper is a flat plate, and is bolted to a slide 131, which is movable between vertical guides on the cross head 15, one of said guides being shown at 132 (Figure 5). The slide and wiper are vertically reciprocated by means including the shaft 31, a cam 133 fixed to said shaft, a rock shaft 134, an arm 135, fixed to the rock shaft, and provided with a trundle roll 136 in the path of the cam 133, an arm 137 fixed to the rock shaft, and a rod 138 connecting the arm 137 with ears 139 on the slide 131.

The wiper is so guided, and its movements are so timed, that it descends and forms the counter flange against the outer faces of the female dies, while the blank is confined between the male and female dies.

The cross head 15, hinged by its ears 15ª and pintle 109 to the lever 106, and the wiper 130, movable in the guides 132 fixed to the cross head, are capable of a slight oscillating movement, of which the pintle 109 is the center, to move the wiper slightly toward or from the outer faces of the male and female molds, with which it co-operates in forming a counter flange, the object being to adjust the wiper to conform to the thickness of the blank and of the flange formed thereon. To adjust the wiper and maintain it at the required adjustment, I provide an oscillatory confining arm, formed by a central member 140 (Figures 4 and 5), and end members 141 and 142 internally threaded to engage right and left threads on the central member, so that the length of the confining arm may be varied by rotating the central member. The end member 141 is pivoted on a fixed stud 143, and the end member 142 is pivoted at 144 to an ear 145 on the cross head 15. Rotation of the member 140 moves the inner face of the wiper toward or from the outer faces of the dies.

I will now describe the automatic mechanism for feeding forward a group or detachment of counter blanks, bending the foremost blank of the detachment to approximately its final curvature, and introducing the body of the blank, while thus bent, into the mold cavity of the female dies 14, while the male die 36 is removed from said cavity.

Secured to the frame at the forward end of the machine, where the operator is stationed, is a table 150 (Figures 1, 2 6 and 7), shown by Figure 6 as supported by fixed uprights 151, the table being preferably inclined downward from its outer end (the left-hand end in Figure 6) to its inner end. The table is provided with two longitudinal slots 152 (Figure 7), preferably formed by the spaced-apart edges of metal plates 153 attached to the table, and overhanging grooves 154 in the table. Associated with the table are two sprocket chains 155 (shown conventionally by Figures 6 and 7), supported by sprocket wheels 156 and 157, fixed to shafts 158 and 159, which are intermittently driven, as hereinafter described, and support the chains with their upper stretches in the table grooves 154.

Pivoted at 160 to the chains 155 are arms 161, each having at its outer end a dog or finger 162. The arms are so arranged that, when they enter the table grooves 154, they are supported by the bottoms of said grooves, so that the fingers 162 project through the slots 152, above the table, in position to engage and feed counter blanks $c$ placed edgewise on the table and extending crosswise of the latter. The bottoms of the table grooves 154 are formed to support the arms 161 until the fingers 162 reach the point indicated by 163 (Figure 6). After the arms pass this point, they drop through the table, out of engagement with the blanks, and against the shaft 158, as indicated at the right of Figure 6. After passing from the shaft 158, the fingers hang down until they are raised by contact with the bottoms of the table grooves 154, at the point indicated by 164, and again enter the grooves.

An operator standing beside the table places the blanks $c$ thereon, between the fingers 162, the blanks being positioned by a gage 165 on the table. The fingers intermittently advance the blanks to the forward end portion of the table, and press the foremost blank against the pickers hereinafter described, which separate the blank from the group, the fingers disappearing successively through the table when they reach the point 163.

The foremost blank is picked from the group and applied to a heel-shaped transferring form 166, formed substantially as shown by Figure 8$^a$, to impart the desired longitudinal curvature to a blank $c$. The form 166 is attached to a standard 167, which is pivoted at 168 to an upright ear 169 on a slide 170. The slide is movable on a horizontal guide 171, supported by fixed uprights 172 on the frame. The standard 167 and slide 170 first occupy the position shown by full lines in Figure 6, the form being in position to receive a blank from the table 150, and elevated above and considerably spaced from the female dies 14. When the form is in this position, it is at what I call the engaging station of the machine, the form being in a substantially horizontal position.

Located at opposite sides of the form 166 are picker arms 173 (Figures 6, 22, 23 and 24), having spurs 174 at their lower ends, adapted to impale the foremost blank on the table and pick or withdraw it from the group, and move the lower edge of its central portion into contact with one end of the form. The picker arms and their spurs are adapted to be advanced toward and withdrawn from the blanks on the table to engage and pick off the foremost blank. They are also adapted to be raised from their operative position to permit the blank to be moved under them by the form 166. Each spur is accompanied by a kicker 176. The two kickers act to kick the impaled blank off from the spurs before the picker arms rise to clear the blank.

Located at opposite sides of the form are vertical rock shafts 187 (Figure 25), carrying blank-bending arms 188. The rock shafts are moved to cause the bending arms to swing inward, engage the ends of a blank picked off and detached from the pickers, and bend the blank around the form 166. The form is provided with clamping jaws 189 (Figure 10), which are pivoted at 190, and are movable from the positions shown by full lines to those shown by dotted lines in Figure 10, to clamp the bent blank against the side portions of the form.

Before the jaws are moved to clamp the blank, and while the latter is in loose contact with the form, the blank is positioned and its ends evened or alined with each other by two swinging eveners 191 and 192 (Figures 6$^a$ and 6$^b$), which are swung toward each other just before the clamps grasp the blank. The front evener 191 is formed to bear on both ends of the blank, and, in case one end is slightly in advance of the other, the ends are alined, one end being pushed back by the evener 191, and the other end being pushed forward until it contacts with said evener. The rear evener 192 bears on the central portion of the blank and presses it during the centering or evening operation.

The evener 191 is mounted to oscillate on a fixed stud 191$^a$, and is the longer arm of a lever, the shorter arm 191$^b$ of which is connected by a rod 191$^c$ with a bell-crank lever 191$^d$ (Figure 6$^d$), fulcrumed at 191$^e$, and having at one end a trundle roll 191$^g$ held by a spring 191$^f$ against a cam 191$^h$ on a shaft 240 hereinafter described.

The evener member 192 is pivoted at 192$^a$ to ears on a support, which may be the stop arm 270 hereinafter described, and is an arm of a lever, the other arm 192$^b$ of which is connected by a rod 192$^c$ with a lever arm 192$^d$, fulcrumed at 192$^e$ and fixed to a lever arm 192$^f$, which is connected by a rod 192$^g$ with a bell-crank lever 192$^h$ (Figure 6$^c$). The latter is fulcrumed at 192$^i$, and has at one end a weight 192$^j$, and at the other end a trundle roll 192$^k$, pressed by the weight against a cam 192$^m$ on the shaft 240.

Portions of the described evener-operating mechanism are shown by Figure 3. Said mechanism is organized to hold the eveners alternately in the full and dotted line positions shown by Figure 6$^a$, and is so timed that, after a blank has been bent upon the form 166 and before it is secured to the latter by the clamps 189, the evener 191 swings from the dotted line to the full line position, while the evener 192 remains in the dotted line position. If the ends of the bent blank are not abreast of each other (see Figure 6$^b$), the evener 191 first strikes the forward end and pushes it back, thus causing a longitudinal creeping motion of the blank until the ends are abreast of each other. The rear evener 192 then swings forward to the full line position against the central or back portion of the blank, and holds the blank against the form 166 until the blank is secured to the form by the clamps. The eveners then return to the dotted line non-obstructing positions until the next blank is in position to be evened.

When a blank has been applied and secured to the form 166, as above described, the standard 167 is first swung to a horizontal position, as shown by dotted lines in Figure 6, the major axis of the form being thus disposed vertically, and the form being in position to enter the mold cavity formed by the female dies. The slide 170 is then moved in the direction of the arrow (Figure 6), until the portion of the mold projecting from the form enters the mold cavity, the male die being out of said cavity. When the form is moved as last described, it is at what I call the delivering station of the machine, the form being in a substantially vertical position. The male die is then raised until the blank is gripped between the male and female dies. The clamping jaws are then released and the form returns to the engaging station.

The finished counter is engaged and removed from the machine by a carrying finger 193 (Figures 2 and 4), attached to an oscillatory arm 194, which is fixed to a sleeve 195. The sleeve is adapted to turn on a horizontal swinging arm 196, fixed to and projecting from a vertical rock shaft 197. The sleeve 195 has a curved arm 198, which is held by a torsional spring 199 against an anti-friction roll 200 mounted on a fixed support 201. The rock shaft 197 has an arm 202 at its upper end, carrying a trundle roll 203, which is held by a torsional spring 204 against a cam 205 on the continuously-rotating shaft 31 previously referred to. The cam 205 acts to rock the vertical rock shaft 197 and swing the arm 196 horizontally. When the arm swings inward toward the jaws, the spring 199 turns the sleeve 195 and swings the arm 194, with the carrying finger 193, to position to engage the counter, as shown by Figure 4.

The shaft 158, carrying the sprocket wheels 156, is provided with a worm gear 206 (Figures 1 and 16). With this gear meshes a worm 207 on a vertical shaft 208. The worm shaft is journaled in fixed bearings, and is provided with an arm 209, carrying a pawl 210, engaging a ratchet wheel 211, fixed to a shaft 212, which is journaled in fixed bearings. A torsional spring 213 is fixed at one end to a collar 214 on the shaft 212, and at its other end to a fixed bearing 215. 216 represents a horizontal arm, mounted to swing on a fixed upright rod 217, and forming the longer arm of a lever, which includes a shorter arm 217$^a$, having a trundle roll 218. The longer arm 216 is connected by a chain 219 with a disk 220, fixed to the spring shaft 212. Two cams 221 on the vertical shaft 53 alternately engage the trundle roll 218. The torsional spring 213 has two functions, one of which is to hold the trundle roll 218 against the cams 221. The other function is to rotate the worm shaft 208 through the ratchet and pawl connection between the shafts 212 and 208.

It will now be seen that the worm gear 206 and the chain-impelling sprocket wheels 156 are intermittently rotated, each rotation being relatively slight and sufficient to advance the blanks step by step only enough at each step to suitably impale the foremost blank on the picker spurs 174.

The picker arms 173 are fixed to a holder 224, which is both vertically and horizontally movable, and is fixed to a rod 225, which is rigidly attached to an oscillating arm 226 (Figures 23 and 24). Said arm is fixed at one end to a collar 227, which is free to turn on a rod 228, carried by the lower ends of two swinging arms 229, the upper ends of which are mounted to swing on a horizontal rod or stud 230, journaled in fixed bearings 231. To the stud 230 is fixed an arm 232, connected by a link 233 with an arm 234 on a shaft 235 journaled in fixed bearings, one of which is shown at 236. The arm 233 has a trundle roll 237, which is yieldingly held by a weight 238 against a cam 239 on the cam shaft 240. The holder 224 is connected by a chain 241 with a swinging arm 242, which is fixed at one end to a collar 243, turning loosely on a fixed horizontal rod or stud 244. To the collar 243 is fixed an arm 245 (Figure 3ª), having a trundle roll 246, bearing on a cam 247 on the shaft 240.

The holder 224 and its picker arms are alternately moved horizontally and vertically by the described mechanism.

The rock shafts 187, carrying the bending arms 188 (Figure 25), are journaled in fixed vertical bearings 248, and have pinions 249 attached to their upper ends, with which mesh two rigidly connected rack bars 250, the pinions and rack bars being so arranged that, when the rack bars are moved endwise, the pinions are rotated simultaneously in opposite directions. The rack bars are connected by a rod 251 with the swinging end of a lever 252, which is fulcrumed at 253 and has a trundle roll 254, bearing on a cam 255 on the shaft 240. A weight 256 on the lever 252 holds the trundle roll against the cam 255. The rotation of the cam 255 causes the rock shafts 187 and bending arms 188 to turn simultaneously in opposite directions, the arms swinging inward toward each other. The cam 255 is stepped so that it briefly arrests the swinging movement of the bending arms when the blank is partly bent and while the kickers are dislodging the blank from the spurs and rising.

The blanks at the forward portion of the advancing group are held down against the table by a plate or guide 259, rigidly supported above the table and having a flat bottom surface, which is parallel with the table and spaced therefrom to bear lightly on the upper edges of the blanks, said edges being in sliding contact with the plate.

After the forward blank has been picked from the group by the spurs 174, the group is arrested by two horizontally swinging stop fingers 260 (Figures 19 and 20), which are movable over the table from the positions shown by Figure 20 to those shown by Figure 19, and, when in the last-mentioned positions, bear on the ends of the foremost blank to hold the same in position to be engaged by the spurs. The stop fingers are attached to vertical rock shafts 261 (Figures 19, 20 and 21), journaled in fixed bearings and provided with arms 262 (Figure 20) projecting in opposite directions and connected by a rod 263, the said arms and rod being arranged to cause the stop fingers 260 to swing simultaneously in opposite directions. One of the arms 262 is connected by a rod 264 with one arm of a weighted rocking lever 265, which is fulcrumed at 266, and has a trundle roll 267, held by the weight 268 against a cam 269 (Figure 21) on the cam shaft 240.

To prevent the counter blank pressed against the form 166 from slipping upward while it is being bent upon the form, I provide a curved stop arm 270 (Figures 6, 29 and 30), which is arranged to bear on the central portion of the upper edge of a counter applied to the form 166. The stop arm 270 is connected at one end with a pair of arms 271 (Figure 30), adapted to oscillate freely on a fixed rod 272. The other end of the stop arm is connected with a rod 273, depending from one arm of a weighted lever 274, which is fulcrumed at 275, and has on its other arm a trundle roll 276, which is held by the weight 277 against a cam 278 on the cam shaft 240. The stop arm 270 is oscillated by the described mechanism in a vertical plane, and is timed to alternately bear on and be removed from the upper edge of a counter blank applied to the form.

The clamping jaws 189 have arms 300, pivoted at 301 to arms 302, which are fixed to shafts 303, mounted in the outer ends of crank arms 304, oscillatable on studs 305 fixed to the swinging standard 167. On the arms 302 are formed laterally-projecting arms 306, having studs 307, adapted to be engaged by tripping fingers 308 on shanks 309. Said shanks are pivoted at 310 to arms 311 fixed to a rock shaft 312, journaled in bearings on the slide 170. The shanks 309 are movable endwise in guides 313 fixed to the slide 170. A spring 314, connected with one of the guides 313 and one of the rock shaft arms 311, normally holds the tripping fingers 308 in the raised position shown by Figures 8 and 9.

The arms 300 and 302 constitute toggle joints which are adapted to be held by torsional springs 315 in either of the positions shown by Figures 9 and 9ª, so that the clamping jaws 189 are held by said springs either open, as in Figure 9, or closed, as in Figure 9ª.

The jaws are moved from the open position shown by Figure 9 to the closed position shown by Figure 9ª when the form 166 and standard 167 are raised and at the engaging station, by the depression of the shanks 309, causing the tripping fingers to act on the outer studs 307. This depression is caused by a vertically-reciprocating hooked head 320 (Figures 8, 9, 17 and 18), which is arranged to bear on a trundle roll 321 on one of the arms 317, and swing both arms 311 downward, thus depressing the shanks 309 and tripping fingers 308. This occurs while the form 166 and its standard 167 are raised.

On the arms 302 are also formed laterally-projecting arms 306ª, having studs 307ª, adapted to be engaged by tripping finger 318 on shank 319 to move the clamping jaws from their closed to their open position when the form is horizontal, and the blank is presented thereby to the forming jaws. The shank is horizontally arranged, and is secured to a holder 320ª, which is pivoted at 323 to an arm 324 fixed to a rock shaft 325. The rock shaft has an arm 326, carrying a trundle roll 327, which is arranged to move under the head 320 when the form is moved forward to present a blank to the shaping dies. The descent of the head 320, therefore, releases the clamping jaws after the blank has been presented to the shaping dies, this release taking place just before the form is moved back from the dies.

The head 320 is fixed to an upright rod or shaft 330, movable in a fixed guide 331, and reciprocated by means of a horizontal cam 332 (Figures 17 and 18) on the vertical shaft 53, a lever 339 fulcrumed at 340 and carrying a trundle roll 341, a rod 334 connected with the lever 339, and a two-armed lever 335 on a fixed fulcrum 336. The rod 334 is provided with a weight 337, and is connected with one arm of the lever 335, the other arm of said lever being connected by a link 338 with the head-carrying rod 330.

The form is tripped and swung by the following means:

Adjacent to the standard 167, and at one side of the path of the swinging movement thereof, is a fixed center or stud 340ª (Figures 8 and 31), on which is fulcrumed a composite member, including arms 341ª, 342, 343 and 344, all connected to oscillate in unison on the stud 340ª. The arm 341ª is connected by a rod 345 with a lever 346 fulcrumed at 347, and having a trundle roll 348, held by a weight on the arm 342 against a cam 349 on the shaft 240. The arm 344 has a stop finger 350, adapted to abut against the form 166 and hold the same in position while the blank is being bent on and secured to the form. The arm 343 has a trundle roll 351, with which co-operates a curved finger 352 fixed to and swinging with the standard 167. When the standard 167 is upright, the standard and form 166 are prevented by their own weight from tipping forward, the center of gravity being at the left of the pivot 168, as shown in Figure 8. The stop finger 350 positively prevents the form from tipping forward until the blank has been secured thereto. The rotation of the cam 349 to the position shown by Figure 32 permits the arm 344 to swing downward, thus removing the stop pin 350 from the form, and causes the arm 343 to swing upward, so that its trundle roll 351 engages the curved arm 352 on the standard 167 and causes the standard to swing forward to a horizontal position.

The slide 170 is connected by a rod 353 with a lever 354 fulcrumed at 355 (Figure 1). One arm of this lever is connected by a rod 356 with a lever 357 (Figure 1ª) on a sleeve 359, which is adapted to turn on a fixed upright rod 358. On the sleeve 359 is a lever arm 360, carrying a trundle roll 361, which is pressed by a spring 362, suitably engaged with the stud 355 and lever 354, against a cam 363 on the upright shaft 53. The cam and the spring 362 act to reciprocate the slide 170. An adjustable stop 364, secured to a fixed upright 365 in the path of the lever 354, limits the forward movement of the slide, and compensates for different widths of counter blank flanges.

After the slide 170 has been moved back from the shaping dies, the standard 167 is swung to a vertical position by means including a sprocket wheel 366, fixed to the standard, a chain 367 fixed at one end to said wheel, a rock shaft 368 Figs. 33 and 34 journaled in fixed bearings, two lever arms 369 and 370 fixed to the rock shaft, the arm 369 being connected with one end of the chain 367, a cam 370ª on the shaft 240, a bell-crank lever 241ª fulcrumed at 242ª, one arm of said lever having a trundle roll 243ª, and a rod 244ª connecting the other arm with the rock shaft arm 370. This mechanism, of course, acts to release the standard 167 and permit it to be swung to a horizontal position at the proper time.

*Operation.*

The operator places the blanks edgewise on the table 154, between the projecting fingers 162. The chains move forward intermittently. The blanks are held down by the downwardly-facing guide 259. The pickers advance to position to impale the foremost blank on the spurs 174. When the pickers reach their forward position, the chains 155 move forward enough to press the foremost blank on to the spurs. This movement of the chains is due to the action of the torsion spring 213, which is under full tension at this time. The tension of the torsion spring is then released, and the blanks are left loose on the table. The pickers swing back to bring the engaged blank forward and separate it from the loose blanks. The oscillating stop fingers 260 then swing inward against the ends of the foremost loose blank, and confine the blanks against endwise and forward movement. The bending fingers 188 then swing inward halfway and then stop, while the kickers 176 remove the blank from the pickers. The pickers and kickers are then raised to clear the blank, and the bending fingers then complete their movement and bend the blank around the form 166.

The evener members 191 and 192 act on the ends and back or center of the blank to properly position the blank on the form. The clamps 189 then grasp the opposite sides of the bent blank and hold it firmly on the form. The eveners now recede, and the form is swung forward in the arc of a circle to a horizontal position, preparatory to insertion of the blank into the cavity formed by the female dies. The counter-carrying finger 193 moves inward to its receiving position, before the form moves forward toward the female dies. The male die, carrying the previously finished counter, moves downward and outward, and the flange of the counter is caught on the finger 193. The finger then swings outward and downward, until the counter drops off into a receptacle. Just after the finger moves outward, the form is moved horizontally to insert the body of the blank between the female dies, the male die being now lowered, so that there is an unobstructed space between the female dies to receive the blank body. The male die then rises and the blank is pressed between the male and the female dies. The male die is then locked against downward movement. The clamps on the form are then released, and the form is moved back horizontally, leaving the blank between the male and female dies. The wiper then moves down and wipes the flange of the counter. As the wiper descends, pressure is exerted, both vertically and horizontally, on the female dies, so that all parts of the counter body are subjected to heavy pressure between the dies, the male die being now locked and rigidly supported. Upon the release of the heavy pressure, the female dies separate, the wiper rises, and the counter-carrying finger 193 moves to its engaging position. The male die swings outward to bring the counter flange over the finger, and then drops by gravity, carrying the counter downward with it, sufficiently to engage the counter flange with the finger, the latter then swinging outward and downward until it discharges the counter.

The only manual operation involved is the placing of the blanks on the table by the operator.

As implied in the foregoing description and in the following claims, I am not limited to the specific mechanism of the embodiment of my improvements shown by the drawings, except as otherwise required in certain of the more limited claims.

I claim:

1. A counter-forming machine, comprising male and female shaping dies, die-operating mechanism including means for entirely withdrawing the male die from the cavity formed by the female dies, and automatic blank-supplying mechanism including means for bending a blank at a station outside the said cavity, means for confining the bent blank, and means for shifting the bent and confined blank to insert its body portion in said cavity, said confining means being adapted to engage the blank until the male mold enters the cavity and to then release the blank.

2. A counter-forming machine, comprising male and female shaping dies, die-operating mechanism including means for entirely withdrawing the male die from the cavity formed by the female dies, and automatic blank-supplying mechanism including a heel-shaped form, supporting and carrying means organized to hold the form alternately at a blank-engaging station and at a blank-delivering station, means adjacent to the engaging station for bending a blank upon the form, blank clamps carried by the form, means operable at the engaging station for closing the clamps upon the bent blank, and means operable at the delivering station for disengaging the clamps from the blank.

3. A counter-forming machine, comprising male and female shaping dies, die-operating mechanism including means for entirely withdrawing the male die from the cavity formed by the female dies, and automatic blank-supplying mechanism including a heel-shaped form, form-supporting and carrying means comprising a slide, an oscillatory form-carrying standard pivoted to the slide, and shifting means having provisions for reciprocating the slide and oscillating the standard so that the form is held alternately in a substantially horizontal position at an engaging station, and in a substantially vertical position at a delivering station, a stop and operating means therefor whereby the form is held at the engaging station and released for movement to the delivering station, means adjacent to the engaging station for bending a blank upon the form, blank clamps carried by the form, means operable at the engaging station for closing the clamps upon the bent blank, and means operable at the delivering station for disengaging the clamps from the blank.

4. In an automatic counter-forming machine, a heel-shaped form, form-supporting and carrying means organized to hold the form in a substantially horizontal position at a blank-engaging station, and in a substantially vertical position at a blank-delivering station, a blank-supporting table adjacent to the engaging station, means for intermittently feeding a group of blanks toward the form, means for detaching the foremost blank from the group and presenting its central portion to the form, means for bending the detached blank upon the form, blank clamps carried by the form, means operable at the engaging station for closing the clamps upon the bent blank, and means operable at the delivering station for disengaging the clamps from the blank.

5. In an automatic counter-forming machine, a heel-shaped form, form-supporting and carrying means organized to hold the form alternately at a blank-engaging station and at a blank-delivering station, a blank-supporting table adjacent to the engaging station, means for intermittently feeding a group of blanks toward the form, pickers and operating means therefor whereby the pickers are held in the path of said blanks in position to be engaged with the foremost blank by the forward movement of the group and are moved to detach the blank from the group and present its central portion to the form, kickers and operating means therefor whereby the detached blank is removed from the pickers, means being provided for displacing the pickers and kickers after the performance of their functions, and bending fingers and operating means therefor whereby the fingers are moved intermittently to first engage the detached blank, then stop for the action of the kickers and until the pickers and kickers have been displaced, and then moved to complete the bending of the blank.

6. In an automatic counter-forming machine, a blank-supporting table, endless carriers movable thereon and provided with spaced-apart blank-engaging fingers projecting above the table, mechanism for moving said carriers intermittently to advance step by step a group of blanks engaged with said fingers, said mechanism including a spring which imparts a yielding step-by-step movement to the said fingers, and pickers and operating means therefor whereby the pickers are held in the path of said blanks during the step-by-step movements thereof, the foremost blank being yieldingly impaled on the pickers.

7. In an automatic counter-forming machine, a blank-supporting table, means for intermittently moving a group of counter blanks thereon, means for detaching the foremost blank from the group, and oscillatory stop fingers movable in opposite directions toward and from the ends of the group, and operating means therefor having provisions for swinging the fingers simultaneously in opposite directions to confine the group after the detachment of the foremost blank.

8. In an automatic counter-forming machine, a heel-shaped form, means for bending a blank upon said form, a stop arm arranged to bear on the upper edge of the blank, and operating means whereby the stop arm is first held in position to prevent upward displacement of the blank while it is being bent and is then displaced from said position.

9. In an automatic counter-forming machine, a heel-shaped form, means for bending a blank upon said form, and blank eveners and operating means therefor whereby the eveners are caused to aline the ends of the bent blank and to hold the bent blank closely against the form.

10. In an automatic counter-forming machine, a heel-shaped form, means for bending a blank upon said form, a front blank evener adapted to bear on the ends of the bent blank, a rear blank evener adapted to bear on the central portion of the blank, and evener-operating means adapted to move said eveners successively to their operative positions, the arrangement being such that the front evener first alines the blank ends and the rear evener then presses the blank closely against the form.

11. In an automatic counter-forming machine, a heel-shaped form, means for bending a blank upon said form, and blank clamping jaws carried by the form and operating mechanism therefor including co-operating toggle members and torsional springs, the arrangement being such that said springs act through the toggles formed by said members to alternately hold the jaws closed and open.

12. A counter-forming machine, comprising a cross head, a pair of female shaping dies loosely connected with said cross head and movable independently of the cross head to open and closed positions, means for opening and closing the female dies, a male die movable into and out of the female dies, means for rigidly supporting the male die within the female dies, and mechanism acting on said cross head to impart a relatively heavy pressure to the female dies, said mechanism including a toggle, a power-actuated rock shaft rendering said toggle alternately active and inactive, and pressure-imparting means actuated by said toggle to move the cross head and thereby exert pressure on the cross head and female dies when the toggle is active.

13. A counter-forming machine, comprising a cross head, a pair of female shaping dies loosely connected with said cross head and movable independently of the cross head to open and closed positions, means for opening and closing the female dies, a male die movable into and out of the female dies, means for rigidly supporting the male die within the female dies, and mechanism acting on said cross head to impart a relatively heavy pressure to the female dies, said mechanism including a toggle, a power-actuated rock shaft rendering said toggle alternately active and inactive, and a pair of pivotally-connected compounded levers, one connected with the toggle and having a swinging fulcrum, and the other connected with the cross head and having a fixed fulcrum.

14. A counter-forming machine, comprising a cross head, a pair of female shaping dies loosely connected with said cross head and movable independently of the cross head to open and closed positions, means for opening and closing the female dies, a male die movable into and out of the female dies, means for rigidly supporting the male die within the female dies, and mechanism acting on said cross head to impart a relatively heavy pressure to the female dies, said mechanism including a toggle, a power-actuated rock shaft rendering said toggle alternately active and inactive, and pressure-imparting means actuated by said toggle to move the cross head and thereby exert pressure on the cross head and female dies when the toggle is active, means being provided for varying the amplitude of the movement imparted to the cross head by said means to compensate for uneven thickness of a counter blank under pressure.

15. A counter-forming machine, comprising a cross head, a pair of female shaping dies loosely connected with said cross head and movable independently of the cross head to open and closed positions, means for opening and closing the female dies, a male die movable into and out of the female dies, means for rigidly supporting the male die within the female dies, and mechanism acting on said cross head to impart a relatively heavy pressure to the female dies, said mechanism including a toggle, a power-actuated rock shaft rendering said toggle alternately active and inactive, a pair of pivotally-connected compounded levers, one connected with the toggle and having a swinging fulcrum, and the other connected with the cross head and having a fixed fulcrum, and means for adjusting said swinging fulcrum to vary the amplitude of the movement imparted to the cross head by said levers.

16. A counter-forming machine, comprising male and female shaping dies having flange-forming faces, a cross head carrying the female dies and provided with wiper guides, means for reciprocating the cross head, a wiper movable in said guides, means for reciprocating the wiper, the cross head and wiper being adjustable relatively to the dies to vary the space between the wiper and the flange-forming faces of said dies, and means for maintaining any adjustment of the cross head and wiper.

17. A counter-forming machine, comprising male and female shaping dies having flange-forming faces, a cross head carrying the female dies and provided with wiper guides, a reciprocating support on which the cross head is pivoted to slightly oscillate, a wiper movable in said guides, and an oscillatory confining arm pivoted to a fixed support and to the cross head, said arm being adjustable to vary the space between the wiper and the flange-forming faces of the dies.

18. A counter-forming machine comprising a pair of female shaping dies pivotally connected to swing toward and from each other, a ram movable in fixed guides toward and from the female dies, a male forming die pivotally connected with the ram, mechanism for reciprocating the ram, and mechanism for swinging the male die outward and inward on the ram to cause the male die to enter the female dies when the ram is moved in one direction, and to swing forward when the ram is moved in the opposite direction.

19. A counter-forming machine substantially as specified by claim 18, the male-die-swinging mechanism being organized to positively swing the die outward, and including a spring which acts to swing the male die inward.

20. A counter-forming machine substantially as specified by claim 18, the male-die-swinging mechanism being organized to positively swing the die outward, and including a spring which acts to swing the male die inward, a reciprocating wiper adapted to finish a counter by forming a flange thereon, an oscillatory counter-carrying finger movable alternately to position to engage the flange of a counter on the outwardly-swung male die, and to position to discharge said counter, and mechanism for oscillating said finger.

21. A counter-forming machine, comprising a pair of female shaping dies, a ram movable in fixed guides toward and from the female dies, a male shaping die carried by the ram, mechanism for reciprocating the ram to cause the male die to enter and leave the female dies, a sliding abutment for rigidly supporting the ram when the male die is within the female dies, and mechanism for reciprocating said abutment to cause it to alternately support and release the ram.

22. A counter-forming machine, comprising a pair of female shaping dies pivotally connected to swing toward and from each other, a ram movable in fixed guides toward and from the female dies, a male shaping die carried by the ram, mechanism for reciprocating the ram, a pair of springs carried by the ram, and a pair of arms pivoted to a fixed support and interposed between said springs and the female dies.

23. An automatic counter-molding machine, comprising blank-supplying mechanism including a heel-shaped form, supporting and carrying means organized to hold the form alternately in a substantially horizontal position at an engaging station, and in a substantially vertical position at a delivering station, clamps carried by the form and adapted to confine a blank bent upon the form, means operative at the engaging station to close the clamps upon the blank, and means operative at the delivering station to open the clamps and separate them from the blank, and molding mechanism incuding female shaping dies forming a mold cavity arranged to receive the body of a blank clamped on the form when the latter is at the delivering station, a male shaping die and means for moving the male die into and out of said cavity, said means being organized to move the male die into blank-shaping position before the said clamps are opened, so that the blank is positively held by the form and clamps until it is held and shaped by said dies.

24. An automatic counter-molding machine, comprising blank-supplying mechanism including a heel-shaped form, supporting and carrying means organized to hold the form alternately in a substantially horizontal position at an engaging station, and in a substantially vertical position at a delivering station, clamps carried by the form and adapted to confine a blank bent upon the form, means operative at the engaging station to close the clamps upon the blank, and means operative at the delivering station to open the clamps and separate them from the blank, and molding mechanism including female shaping dies forming a mold cavity arranged to receive the body of a blank clamped on the form when the latter is at the delivering station, a male shaping die, and a flange-forming wiper arranged to cooperate with said dies, means for moving the male die into and out of the said cavity, said means being organized to move the male die into blank-shaping position before said clamps are opened, and wiper-operating means organized to act after the withdrawal of the form from the delivering station and from the delivered blank.

25. An automatic counter-molding machine, substantially as specified by claim 23, said blank-supplying mechanism including also means for presenting a blank to and bending it upon said form when the latter is at the engaging station.

26. An automatic counter-molding machine, substantially as specified by claim 23, said blank-supplying mechanism including also a feed table adapted to support a group of blanks adjacent to the engaging station, means for detaching the foremost blank from the group, means for forwarding the detached blank to the form, and means for bending the forwarded blank upon the form.

In testimony whereof I have affixed my signature.

ALBERT F. JONES.